(12) United States Patent
Romailler et al.

(10) Patent No.: US 12,278,901 B2
(45) Date of Patent: Apr. 15, 2025

(54) SYSTEMS AND METHODS FOR REGISTERING OR AUTHENTICATING A USER WITH A RELYING PARTY

(71) Applicant: NAGRAVISION SARL, Cheseaux-sur-Lausanne (CH)

(72) Inventors: Yolan Romailler, Cheseaux-sur-Lausanne (CH); Nils Amiet, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 435 days.

(21) Appl. No.: 17/547,467

(22) Filed: Dec. 10, 2021

(65) Prior Publication Data

US 2022/0191023 A1 Jun. 16, 2022

(30) Foreign Application Priority Data

Dec. 14, 2020 (EP) ..................................... 20213896

(51) Int. Cl.
*H04L 9/30* (2006.01)
*H04L 9/08* (2006.01)
*H04L 9/32* (2006.01)

(52) U.S. Cl.
CPC .......... *H04L 9/3073* (2013.01); *H04L 9/0894* (2013.01); *H04L 9/3242* (2013.01); *H04L 9/3247* (2013.01); *H04L 9/3271* (2013.01)

(58) Field of Classification Search
None
See application file for complete search history.

(56) References Cited

U.S. PATENT DOCUMENTS

| | | | | |
|---|---|---|---|---|
| 4,731,841 A * | 3/1988 | Rosen | .................. | H04L 9/3271 380/28 |
| 8,412,943 B2 * | 4/2013 | Pang | .................. | G06Q 20/388 713/168 |
| 9,800,411 B1 * | 10/2017 | Brown | .................. | H04W 12/06 |
| 10,075,437 B1 | 9/2018 | Costigan et al. | | |
| 10,990,779 B1 * | 4/2021 | Johanson | ............. | G06K 7/1473 |
| 11,888,997 B1 * | 1/2024 | Bowen | .................. | H04L 9/3247 |
| 2019/0149337 A1 | 5/2019 | Savanah et al. | | |
| 2019/0190723 A1 * | 6/2019 | Lee | ........................ | H04L 9/3231 |
| 2020/0280550 A1 | 9/2020 | Lindemann et al. | | |

(Continued)

OTHER PUBLICATIONS

European Search Report dated Jun. 1, 2021 for European Patent Application No. 20213896.2, 8 pages.

(Continued)

*Primary Examiner* — Jeffrey R Swearingen
(74) *Attorney, Agent, or Firm* — POLSINELLI LLP

(57) ABSTRACT

A method of registering or authenticating a user with a relying party is provided, the method including: receiving a request to generate a key pair, the request including key-generation data, the key-generation data including relying party information; deterministically generating, based on at least the key-generation data and a secret key stored in a memory of the authenticator, a key pair comprising a public key and a private key; either: transmitting the public key, or performing further processing using the private key; and deleting the key pair. An authenticator configured to perform the process is also provided.

20 Claims, 9 Drawing Sheets

(56) References Cited

U.S. PATENT DOCUMENTS

2022/0300962 A1* 9/2022 Zia .................. G06Q 20/326
2023/0334491 A1* 10/2023 Leddy, III ............ G06Q 20/401

OTHER PUBLICATIONS

"Web Authentication: An API for accessing Public Key Credentials, Level 1" retrieved from https://www.w3.org/TR/webauthn-1/ on Apr. 13, 2022. 8 pages.
"Client to Authenticator Protocol (CTAP)" retrieved from https://fidoalliance.org/specs/fido-v2.0-ps-20190130/fido-client-to-authenticator-protocol-v2.0-ps-20190130.html on Apr. 13, 2022, 5 pages.
"Replacing passwords with FIDO2 updated slides and resources" Kudelski Security Research retrieved from https://research.kudelskisecurity.com/2020/07/08/replacing-passwords-with-fido2-updated-slides-and-resources/ on Apr. 13, 2022, 3 pages.
"FIDO2: Solving the Password Problem"—Kudelski Security Research, retrieved from https://research.kudelskisecurity.com/2019/10/08/fido2-solving-the-password-problem/ on Apr. 13, 2022, 26 pages.
"FIDO2: Deep Dive: Attestations, Trust model and Security" Kudelski Security Research retrieved from https://research.kudelskisecurity.com/2020/02/12/fido2-deep-dive-attestations-trust-model-and-security/ on Apr. 13, 2022, 22 pages.
"Web Authentication: An API for accessing Public Key Credentials, Level 2" retrieved from https://www.w3.org/TR/webauthn/#sctn-attestation on Apr. 13, 2022, 174 pages.
"Standards for Efficient Cryptography SEC 1: Elliptic Curve Cryptography" retrieved from https://www.secg.org/sec1-v2.pdf on Apr. 13, 2022, 8 pages.

* cited by examiner

SYSTEMS AND METHODS FOR REGISTERING OR AUTHENTICATING A USER WITH A RELYING PARTY

CROSS-REFERENCES TO RELATED APPLICATIONS

This application claims the benefit of European Patent Application No. 20213896.2, filed Dec. 14, 2020, which is hereby incorporated by reference in its entirety.

TECHNICAL FIELD

The present application relates to systems and methods for registering and authenticating a user of e.g. a client device, with a relying party.

BACKGROUND

The FIDO2 authentication scheme was developed by the FIDO Alliance and the World Wide Web consortium, and at its core is an authentication scheme which combines the W3C WebAuthn standard[1] and the FIDO Client to Authenticator Protocol (CTAP). FIDO2 provides a secure, passwordless authentication scheme, which is described on the applicant's website[3][4][5].

While the scheme is effective, it requires that for every e.g. (website, username) pair, a specific elliptic curve cryptography key-pair is stored. This gives rise to hard limits on the number of kay-pairs which can be stored on a device, since a single elliptic curve key-pair typically requires at least 64 B of storage. This means that one cannot typically expect a single hardware token (i.e. authenticator) to store the credentials required for all of a user's (website, username) pairs. Existing products such as YubiKey, SoloKey, and Titan Key all have such a storage limitation. For example, the YubiKey 5 Series devices can hold up to 25 resident keys only. This is clearly not enough to last a whole lifetime, since a user is very likely to register an account on more than 25 different website/authentication providers.

[1] https://www.w3.org/TR/webauthn-1/
[2] https://fidoalliance.org/specs/fido-v2.0-ps-20190130/fido-client-to-authenticator-protocol-v2.0-ps-20190130.html
[3] https://research.kudelskisecurity.com/2020/07/08/replacing-passwords-with-fido2-updated-slides-and-resources/
[4] https://research.kudelskisecurity.com/2019/10/08/fido2-solving-the-password-problem/
[5] https://research.kudelskisecurity.com/2020/02/12/fido2-deep-dive-attestations-trust-model-and-security/

A possible solution to this issue is to encrypt the credentials, and to store them on a location external to the authenticator itself. However, this requires the credentials (and specifically, the private key) to leave the authenticator. This presents a serious disadvantage, since the transmission of the private key from the authenticator to another device greatly increases the vulnerability of the system to attack. The present application aims to provide a solution to this issue.

SUMMARY

The present application relates both to a method of registering a user of a client device with a relying party, and also, once the user is registered, a method of authenticating the user to access the relying party. In broad terms, the inventive concept which is central to both the registration and authentication processes, is the same: rather than relying on an authenticator to store a plurality of key pairs, the requisite key pair is generated on the fly each time a user wishes to be authenticated. More specifically, the key pair is generated in a deterministic, and therefore repeatable, fashion from at least a secret key stored on the authenticator, and at least some information relating to the relying party. In doing so, the authenticator need only store the secret key, and have some limited processing capability. This is advantageous over the prior art, because the amount of memory available on the authenticator no longer become a limiting factor in into how many relying parties a single authenticator can be used to "log in". It should be stressed that the "secret key" which is used to generate the key is not the same as the generated key. The secret key is preferably stored in persistent memory on the authenticator, but the deterministically generated key is preferably stored only ephemerally.

Accordingly, a first aspect of the application provides a method of registering or authenticating a user with a relying party, the method including the steps of: receiving a request to generate a key pair, the request including key-generation data, the key-generation data including relying party information; deterministically generating, based on at least the key-generation data and a secret key stored in a memory of the authenticator, a key pair comprising a public key and a private key; either: transmitting the public key, or performing further processing using the private key; and deleting the key pair. It will be appreciated that the first aspect of the application is broad, and it should be noted that it applies to both the registration and authentication processes. Clearly, these processes will involve different steps, however, in the context of this application, they are linked by the same core inventive concept, namely the deterministic, "on the fly", generation of a key pair based on a secret key stored on an authenticator, and data contained in a request which is received by the authenticator. Herein, it can be appreciated that when it is stated that the key pair is generated "deterministically . . . based on at least the key-generation data", this means that some deterministic process is applied to the key generation data (and therefore the relying party information). It does not simply mean that a key is generated to be associated with some relying party information—the relying party information is an important input to the key generation process.

In the subsequent discussion, we first set out a number of optional features which apply to the application at this high level (i.e. independently of whether it is a registration or authentication process), before turning to optional features which pertain more specifically either to the registration or authentication process.

The method of the first aspect of the application also refers to a "relying party", which is an entity or party which relies on the registration/authentication process of the present disclosure. For example, a relying party may be a website which requires authentication to log-in, or some other service which requires the level of security provided by the present disclosure. The relying party may be accessed using the client device First of all: optional features relating to the generation of the key pair.

The present application is applicable to elliptic curve cryptography (ECC). It is therefore preferred that the key pair is an elliptic curve key pair. A more detailed explanation of ECC is set out later in this application. When a predetermined action (described later on) is carried out on the base point, one arrives at a second point. The same action may then be performed on the second point to yield a third point. When the action is performed k times, one arrives at a final point P. In ECC, the final point P is the public key, and the integer k is the private key. It is straightforward to generate P given the knowledge of the base point, the predetermined action and the value k. But, when k is large (typically a random integer of bit size equal to the bit size of the order of the underlying integer ring, which is typically 256 bits or more), it is computationally extremely difficult (i.e. effectively impossible) to calculate the value of k with knowledge only of the base point, the predetermined action, and the final point P. Therein lies the effectiveness of ECC. The present application is not applicable only to ECC, but is advantageous when applied to any cryptographic techniques where derivation of the private key k based only on a public key P relies on the solution of a discrete logarithm problem. In the groups of cryptographic interest, no simple algorithm has yet been devised by mathematicians for solving such a problem.

In order to generate the key pair, knowledge of the elliptic curve equation, the base point, and the predetermined function is also required. Accordingly, in some cases, the memory of the authenticator may store the elliptic curve equation, the base point, and the predetermined function. Alternatively, the authenticator may receive the elliptic curve equation, the base point, and the predetermined function from an external source such as the client device. For example, in addition to the relying party information, the key-generation data may include the elliptic curve equation, the base point, and the predetermined function. With this in mind, generating the key pair may comprise: deterministically generating an integer k based on the secret key and the key-generation data; and deriving a point P based on the integer k and the data. Then, as discussed, the point P is the public key, and the value k is the private key.

For use in ECC, it is preferred that the private key k meets certain requirements. Upon generation, it should be within the correct range for it be accepted as an elliptic curve key. For example, in some cases, it must be smaller than the curve order. It is also preferably generated without relying on modular reduction, in order to avoid modulo bias. In preferred cases, therefore, the step of generating the key pair is based on rejection sampling.

How, then, is the integer k generated? As discussed, the integer k is generated based upon at least the key-generation data, and a secret key stored in the memory of the authenticator. The secret key can take a number of forms, as will be clear from the following. It is important that the key-generation process is based on, at least in part, a secret key which is stored on (and unique to) the authenticator, because this means that the key cannot be deterministically generated elsewhere.

In preferred cases, the method includes applying a one-way function to a one-way function input, the one-way function input including or being based on the key-generation data. In such cases, the output of the one-way function may be an integer, or the method can further include a step of generating an integer from the output of the one-way function. In methods such as this, the secret key can be incorporated in one, two, or all three of the following ways:

The secret key may be in the form of a secret salt, which is added to or concatenated with the key-generation data, or a representation thereof, before the one-way function is applied. Accordingly, the method may further include the step of combining a salt with the key-generation data, to generate a one-way function input, and applying a one-way function to the one-way function input to generate the one-way function output. In these cases, the one-way function could be a hash function (e.g. SHA-2, SHA-3, Blake2, and Blake3, or any other cryptographically secure hash function, provided that the hash function output at least as big as the curve order, in which case it may further include a step of truncating the hash function output), a key stretching function, or a password derivation function.

The one-way function may be in the form of a keyed one-way function including a secret function key. In these cases, the function itself depends on the function key (i.e. if the one-way function were applied to the same input twice, the results would only be the same if the same function key were used both times). In this case, the secret key may be the function key. Accordingly, the method may further include a step of applying a keyed one-way function, the output of which is dependent on the function key K, to the one-way function input to generate the one-way function output. Preferably, the keyed one-way function is an HMAC (hash-based method authentication code) function, and the function key is an HMAC key.

The secret key may be in the form of a master key which is added to or concatenated with the one-way function output. Accordingly, the method may further include applying a one-way function to the one-way function input and combining a master key with the one-way function output, for example by adding the master key to the one-way function output or concatenating the one-way function output with a master key. In these cases, particularly applied to elliptic curve cryptography, it is preferable that the master key is compatible with an ECC key—i.e. that the master key is smaller than the curve order.

Methods according to the first aspect of the disclosure allow for a significant space-saving on an authenticator. This can be seen by considering the data which the authenticator actually needs to store. Currently, authenticators are required to store a few things alongside the private key: for example the relying party ID, the user handle, the user ID—we may refer to this as the key-generation data. Let us say that the relying party ID (i.e. the domain name) is 15 bytes long on average, the user handle is up to 64 bytes in length, the user ID is up to 16 bytes in length. In addition to this, the private key, which may vary depending on the algorithm used. However, most suppliers use ECDSA with the P-256 curve, which results in a 256 bit, or 32 byte private key. This gives a total of 63 to 127 bytes in total (depending on the length of the user handle) per credential. According to the present disclosure, it is not necessary to store the private key. Strictly speaking, it is also not necessary to store the user handle, but that would make it more difficult to select the account for users with more than one account on a given website, so preferably the user handle is stored. In addition, a single secret key can be stored (and in some cases must be stored), at e.g. 32 bytes.

This reduction means that an authenticator which is configured to operate the method of the first aspect of the disclosure requires only 31 to 95 bytes per credential, and an additional 32 bytes for the secret key. If the device stores, say, 40 credentials, then saving is therefore between 24% and 50%, a marked improvement on the prior art. Because the secret key must be stored whatever, the larger the number of credentials, the greater the space saving.

In view of the above, an authenticator which may be used to perform the method of the present disclosure may be configured to store, in addition to a secret key, a plurality of credentials. Each credential may include relying party information (e.g. including a relying party ID which may be in the form of a URL), and user information (which may include a user ID and/or a user handle). Crucially, the authenticator may be configured not to store the key-pair in persistent memory. It is preferred that the memory is configured to allocate no more than 95 bytes per credential.

In some cases, the authenticator may be configured only to store the secret key, even further reducing the capacity requirements of the authenticator. To enable this, the client device may include a wrapper which is configured to store all of the other information (e.g. the relying party information, user ID, user handle). Alternatively, the authenticator may include an interface via which the other information required to generate a key-pair for a credential can be received. For example, the authenticator may include a micro-SD card slot, or equivalent interface which can be used to store the other credential information.

As discussed, the request includes key-generation data, and the key-generation data includes relying party information. Specifically, the relying party information may include a relying party ID, which identifies the relying party, preferably uniquely. In addition to this, the key-generation data may include a user ID, which identifies a user of the client device who is seeking to register or authenticate themselves with the relying party, again preferably uniquely. So, in preferred implementations of the present disclosure, the key-generation data may include a data pair (user ID, relying party ID), and the private key may be generated based on the secret key and such a data pair. Alternatively, the private key may be generated based on the secret key and just e.g. the user ID or the relying party ID. In any event, this means that based on a tuple of data specific to a given user and a given relying party such as a 2-tuple of (user ID, relying party ID), a unique key pair may be deterministically generated, using relatively straightforward algorithms. It should be stressed that other data may be included in the tuple, such as a specific user input, or a URL of a web service. The tuple is preferably of size 2, but may also be of size 3, 4, 5, 6 or any suitable integer. In some cases a credentials map including e.g. a relying party ID and username may be stored on the authenticator. Because the private key need not be stored on the authenticator, the memory requirements of the authenticator are much-reduced.

In order to provide an additional degree of security, before the step of generating the key pair, the user may have somehow to "prove" that they are the user associated with e.g. the user ID being used to access the relying party. In other words, the present disclosure may be adapted to provide two-factor authentication.

Accordingly, the method may further include a step of requesting an authorization input from a user, and subsequently receiving the authorization input. Such an authorization input may be received at either the client device or the authenticator itself. Examples of suitable authorization inputs include a password, a PIN, a biometric input (e.g. face recognition, a fingerprint, an iris scan, a retinal scan, or a voice recognition), or an authorization gesture (e.g. tracing a pattern). The method may further include a step of validating the authorization input. Validating the authorization input may include comparing data derived from the authorization input with stored data corresponding to an expected authorization input associated with the user in question. If is determined that the data derived from the authorization input matches the stored data corresponding to the expected authorization input associated with the user in question, then the authorization input is validated. Otherwise, it is determined that the authorization input is not valid. Then, if the authorization input is validated, the step of generating the key pair may take place. If the authorization input is not validated, then the generating step may not take place.

In some cases, the generation of the key pair may be based on the key-generation data, the secret key, and a user input, such as a password, a PIN, a biometric input (e.g. face recognition, a fingerprint, an iris scan, a retinal scan, or a voice recognition), or an authorization gesture. This provides an additional layer of security, in order to ensure that the correct private key can only be generated by a specific user. In other words, if for some reason, another user has the authenticator, they will not be able to generate the correct private key, either because they won't know the password, PIN, or authorization gesture, or because their biometric data will not match.

In registration processes, the request is a registration request. In response to that request, the method may further include a step of receiving a request for an authorization input.

In some cases, the method is a method of registering a user with a relying party. In such cases, the method may include a step of e.g. a client device transmitting a registration request to the relying party (or, equivalently, a relying party receiving a registration request from a client device. Specifically, the request may be transmitted to, or received by, a relying party server. In response to that, the relying party (or relying party server) may transmit the relying party information to the client device, which in addition to the relying party ID, may further include one or more of the following: a challenge; a list of public key algorithms that the relying party supports. Equivalently, the client device may receive the relying party information from the relying party (or relying party server). In response to receiving this information from the relying party, the client device may then send the request to generate a key-pair to the authenticator (and accordingly the authenticator receives the request to generate the key-pair). At this point, and optionally in response to the receipt of the request to generate the key-pair, the authenticator or client device may be configured to issue a request for an authorization input, described in the previous paragraph. For example, the authenticator may receive the request for an authorization input from the client device. The authorization input may be received by either the authenticator or the client device. As will be discussed in greater detail later, the authenticator may be a module of the client device too.

At this point, the key-pair may be generated using the methods outlined already. In the registration process, the method may include a step of transmitting the public key, e.g. to the client device.

In these implementations of the disclosure, in which the method is part of a registration process, the method may include a step of transmitting an attestation objection to the client device. In the context of the present application, and in line with the known FIDO2 protocol, the term "attestation" refers to a mechanism by which the provenance of an authenticator can be asserted. In the present disclosure, the attestation object may include the public key, and optionally one or more of: a credential ID associated with the public key, and an attestation signature. Details of the attestation signature will be described in more detail later on in this application. The relying party may verify the attestation object and make sure that the emitted data comes from a trusted authenticator. Thus, allowing relying parties to trust authenticators that claim user verification was performed. It should be stressed that this step is performed externally to the authenticator, though. Then, the relying party may store the public key in combination with e.g. a user ID.

The authentication process is similar. In this case, the method may include a step of e.g. a client device transmitting an authentication request to the relying party (or, equivalently, a relying party receiving an authentication request from a client device). Specifically, the request may be transmitted to, or received by, a relying party server. In response to that, the relying party (or relying party server) may transmit a challenge to the client device. In response to receiving the challenge from the relying party, the client device may then send the request to generate a key-pair to the authenticator (and accordingly the authenticator receives the request to generate the key-pair). At this point, and optionally in response to the receipt of the request to generate the key-pair, the authenticator or client device may be configured to issue a request for an authorization input, as described earlier. For example, the authenticator may receive the request for an authorization input from the client device. The authorization input may be received by either the authenticator or the client device. As will be discussed in greater detail later, the authenticator may be a module of the client device too.

In these implementations of the disclosure, in which the method is part of an authentication process, the method may include a step of transmitting an assertion signature to the client device. In the context of the present application, and in line with the known FIDO2 scheme, the term "assertion" refers to a mechanism by which the provenance of an authenticator can be asserted. It differs from "attestation" in that attestation takes place during a registration process, and assertion takes place during an authentication process.

The method may further include a step of generating an assertion signature. In addition to the relying party information, the authenticator may also receive authentication challenge data from the client device, and the step of generating the assertion signature may include using an authentication algorithm such as a digital signature algorithm, and transmitting the generated assertion signature to the client device. The client device may then transmit the assertion signature to the relying party, whereupon the relying party can verify the assertion signature.

The discussion above relates to the first aspect of the disclosure, namely a method. A second, corresponding aspect of the disclosure is directed towards an authenticator configured to perform the method of the first aspect of the disclosure. Accordingly, all of the optional features set out above, with reference to the first aspect of the disclosure, apply equally well to the second aspect of the disclosure, and will not be repeated here, for conciseness.

For completeness, the second aspect of the disclosure provides an authenticator for registering or authenticating a user with a relying party, the authentication configured to: receive a request to generate a key pair, the request including key-generation data, the key-generation data including relying party information; deterministically generate, based on at least the key-generation data and a secret key stored in a memory of the authenticator, a key pair comprising a public key and a private key; either: transmit the public key, or perform further processing using the private key; and delete the key pair. The authenticator may include a processor configured to perform the generating step, and/or the further processing step. The authenticator may also include receiving means for receiving the request, and/or the transmitting means configured to transmit the public key. The receiving means and the transmitting means may form part of an interface providing data communication between the authenticator and e.g. a client device. Herein, the term memory may be used to refer to a "persistent" memory such as a permanent memory. This is in contrast to e.g. a buffer or a cache, where data is stored only temporarily until it has been processed in some way, at which point it may be deleted from the temporary memory. The authenticator of the second aspect of the disclosure may be configured to perform the key-generation in the context of both a registration process (e.g. in response to a registration request) and an authentication process (e.g. in response to an authentication request). An important aspect of the present disclosure is that the generated key is preferably never stored on any persistent memory. It may be stored on some temporary memory for the duration that is required for any subsequent processing. However, in preferred cases, the key is deleted from temporary memory immediately after it has been used for subsequent processing. This is advantageous in terms of security and reduction in storage requirements of the authenticator.

In the context of this application, the term "authenticator" is used to refer to either a device or a module which is configured to perform at least the steps of the method of the first aspect of the disclosure. The client device may be in the form of a smartphone, a tablet, or a computer.

The authenticator may be a standalone device including an interface, as discussed, for connecting with the client device, such as a USB or other physical connection. Alternatively, the authenticator may be configured to connect with the client device via a wireless connection, such as a Wi-Fi, cellular, or Bluetooth connection. In other cases, the client device may include the authenticator in the form of a module, which may be referred to herein as an "authenticator module". The authenticator module may either be in the form of a physical module, or a software-implemented module. Throughout this application, the terms authenticator and authenticator module may be treated interchangeably.

Another aspect of the disclosure may provide a system including an authenticator according to the second aspect of the disclosure, as well as a client device and a relying party (or relying party server). The optional features applying to this aspect of the disclosure are the same as those which apply to the first and second aspects of the disclosure.

A further aspect of the disclosure provides a computer program or computer program product comprising instructions which, when the program is executed by a computer, cause the computer to carry out the method of the first aspect of the disclosure. Similar optional features apply. Yet a further aspect of the disclosure provides a computer-readable data carrier having stored thereon the computer program or computer program product of the previous aspect of the disclosure.

BRIEF DESCRIPTION OF THE DRAWINGS

The present disclosure will now be described with reference to the accompanying drawings, in which.

DETAILED DESCRIPTION OF THE EMBODIMENTS

Figure 1:
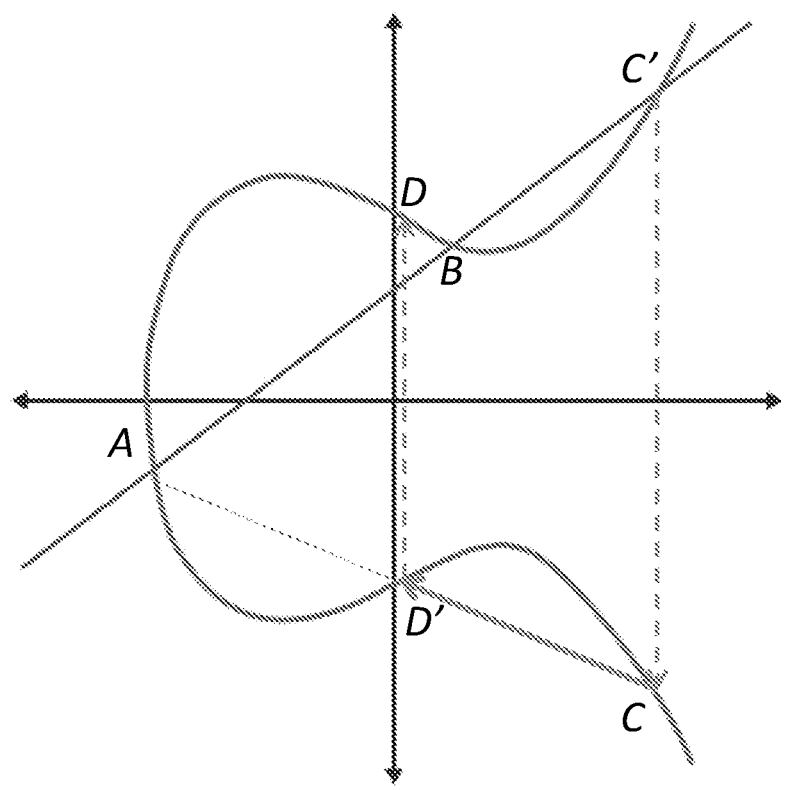
FIG. 1 is a diagram illustrating the principles behind elliptic curve cryptography.

FIG. 1 is provided to illustrate the principles of elliptic curve cryptography. In FIG. 1 an elliptic curve is shown with an equation of the form:

$$y^2 = ax^3 + bx + c$$

A base point A on the curve is shown. A line L passes through point A, and a second point B. This provides all of the necessary information to generate the public and private key.

With knowledge of the curve equation, base point A, and a second point B, a point C' can be determined, which represents the next intersection between the line L and the elliptic curve. This point is then reflected in the x-axis to give point C.

To use the language of the application which was previously used, the predetermined function (which depends on the elliptic curve equation and the base point A) takes as its inputs the point B, and the elliptic curve equation, and outputs the point C. Specifically, the predetermined function identifies the third point at which a line passing through a base point A and the input point B intercepts an elliptical curve, and outputs the point which is a reflection of this point in the x-axis.

This may be represented:

$$f(B) \to C$$

This function can then be repeated on the point C, to give point D. This process may be repeated k times. For large k, and when the values a, b, and c, in the elliptical curve equation are high, it is straightforward to identify a final point P with knowledge of the function and the starting point. However, for large k, it is extremely difficult to identify k with only knowledge of P and the predetermined function. As discussed, P represents the public key, and k represents the private key. The asymmetry makes elliptic curve cryptography a very powerful cryptographic technique.

It should be stressed that the process described above, with reference to FIG. 1 illustrates the principles of elliptic curve cryptography in a simple case only. Here, the problem is considered with the real numbers only, but in practice, finite fields are used. An explanation of how this may be carried out may be found in SEC-1[6], the elliptic curve cryptography standard, the entirety of which is incorporated herein by reference.

[6] https://www.secg.org/sec1-v2.pdf

Figure 2A:
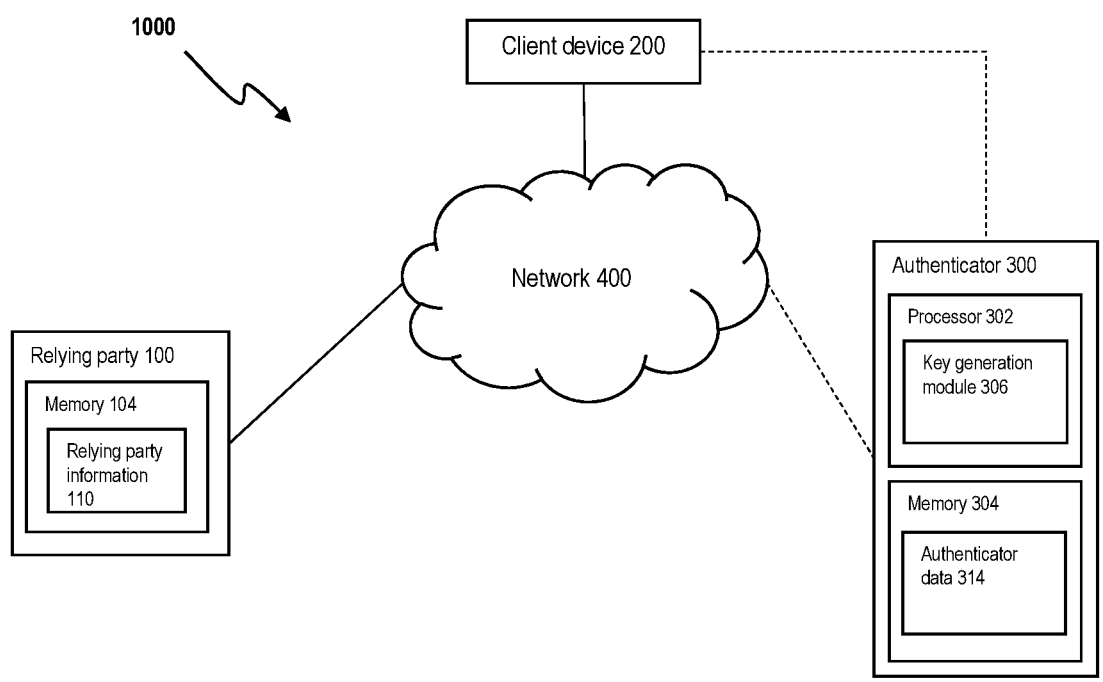
FIG. 2A is a high level diagram of a system which may be used to perform the first aspect of the disclosure.

FIG. 2A is a system diagram showing, at a high level, a system 1000 which may be used to perform the method of the present disclosure in broad terms. System 1000 includes a relying party 100, a client device 200, and an authenticator 300. The relying party 100 and the client device 200 are connected to each other via a network 400, which may be a local area network (LAN), a wide area network (WAN), a cellular network, a Wi-Fi network, or any other type of suitable wired/wireless network. The client device 200 is also connected to the authenticator 300. In some cases, the client device 200 may be connected to the authenticator 300 via the network 400 (or a second, separate network, not shown). Alternatively, the client device 200 may be connected directly to the authenticator 300, e.g. via a USB connection, or via a Bluetooth connection. Alternatively, as shown, and as will be described in more detail with reference to FIG. 8, the authenticator 300 may be in the form of an authentication module which is located in or on the client device 200. In the high level example system 1000 shown, the relying party 100 has located thereon a memory 104, the memory 104 storing relying party information 110. The nature of the relying party information 110 will be described in more detail later in this application. The authenticator 300 has located thereon a processor 302 and a memory 304. The processor includes a key generation module 306, and the memory stores authenticator data 314, which may include a secret key. The key generation module 306, and all other functional modules which form part of any component of the system 1000, or any other system described in this application, may either be in the form of a bespoke hardware module, or a module which is implemented in software.

Figure 2B:
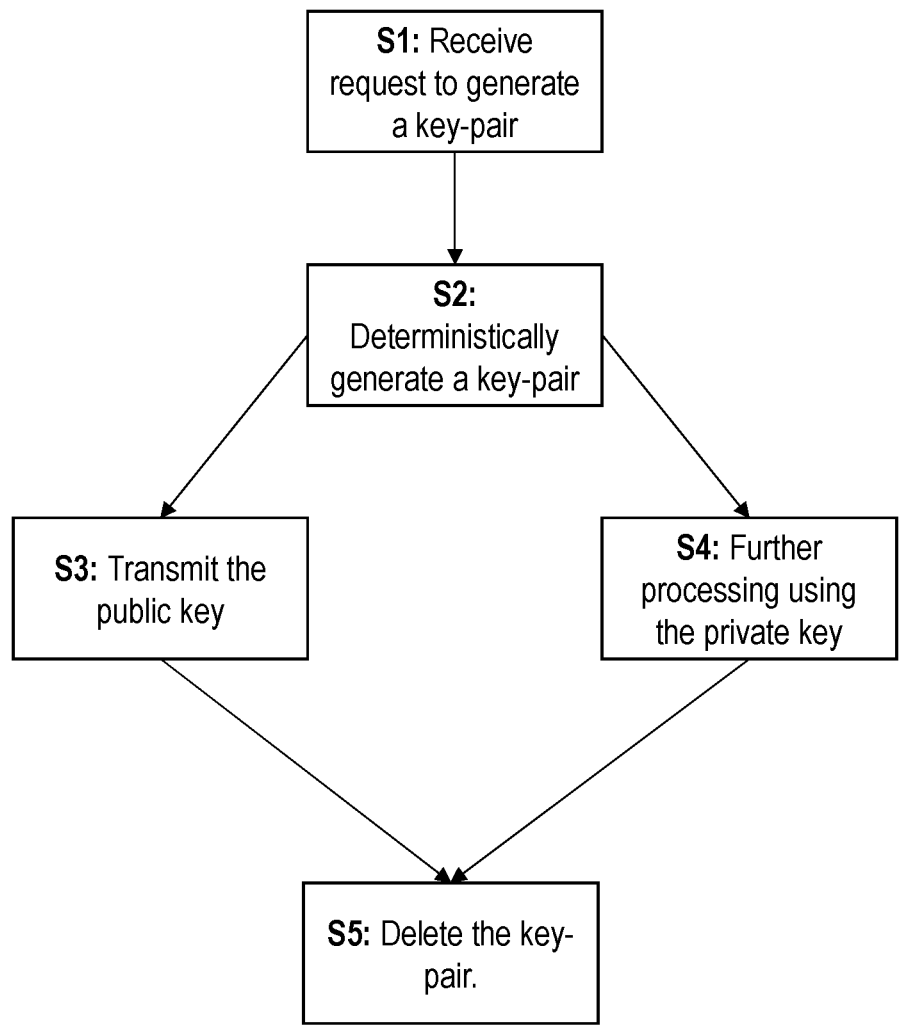
FIG. 2B is a flowchart illustrating the step of the method of the first aspect of the disclosure.

The operation of the system 1000 shown in FIG. 2A will now be described, with reference to FIG. 2B, which is a flowchart showing the main steps performed in the method of the first aspect of the present disclosure. In step S1, a request to generate a key-pair is received. This request is usually sent by the client device 200, and received by the authenticator 300, and includes key-generation data. In response to this request, the authenticator 300 deterministically generates a key-pair (i.e. a private key k and a public key P). This deterministic generation is based on at least the key-generation data and the secret key which is stored in the memory 304 of the authenticator 300. If the method takes place as part of a registration process, the next step is step S3, in which the generated public key P is transmitted by the authenticator to the client device 200. On the other hand, if the method takes place as part of an authentication process, the next step is step S4, in which further processing using the private key k takes place. In both cases, after either the transmission in S3 or the processing in S4 takes place, both the private key k and the public key P are deleted from the authenticator 300. As we have discussed previously in this application, it is possible to delete the key-pair because it is generated deterministically from information relating to the relying party, and can therefore be reliably generated more than once.

Figure 3:
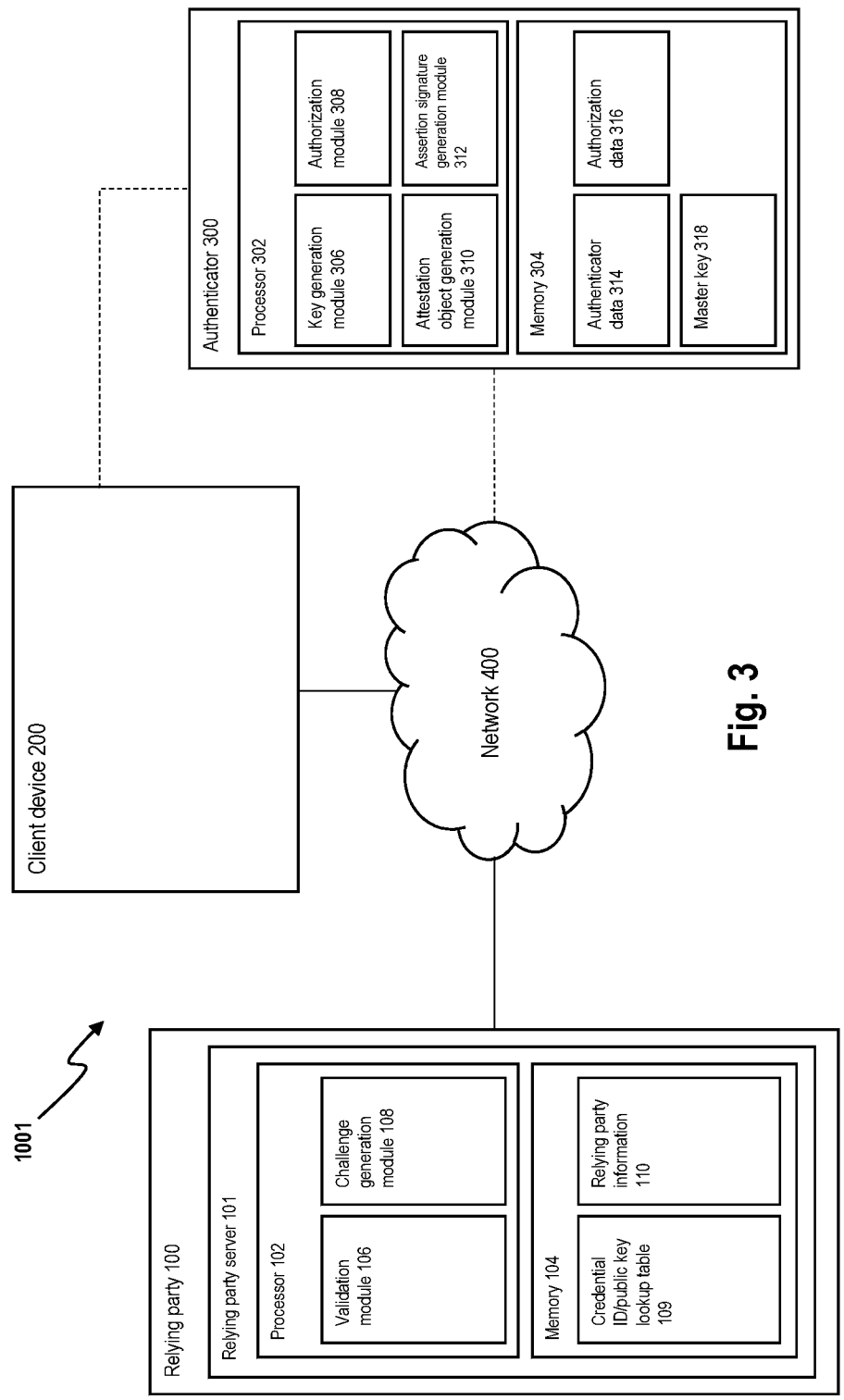
FIG. 3 shows an example of another system which may be used to perform the method of the first aspect of the disclosure.

FIG. 3 is an example of a system 1001 which can be used to perform the method of the present disclosure. FIGS. 4 to 7 are flowcharts showing optional features of the method of the present disclosure. We first describe the architecture shown in FIG. 3, and then provide a detailed description of the process which it is arranged to perform. Additional optional features which are not shown in the drawings will also be set out, where necessary.

Where features in FIG. 3 correspond to features already described in FIG. 2A, the same reference numerals are used, for consistency. As with system 1000 of FIG. 2A, system 1001 of FIG. 3 includes a relying party 100, a client device 200, and an authenticator 300. Again, as with in FIG. 2A, the relying party 100 and the client device 200 are connected via a network 400, which may be a local area network (LAN), a wide area network (WAN), a cellular network, a Wi-Fi network, or any other type of suitable wired/wireless network. The client device 200 is also connected to the authenticator 300. In some cases, the client device 200 may be connected to the authenticator 300 via the network 400 (or a second, separate network, not shown). Alternatively, the client device 200 may be connected directly to the authenticator 300, e.g. via a USB connection, or via a Bluetooth connection. Alternatively, as shown, and as will be described in more detail with reference to FIG. 8, the authenticator 300 may be in the form of an authentication module which is located in or on the client device 200.

The relying party 100 includes a relying party server 101, having located thereon a processor 102, and a memory 104. The processor 102 includes a validation module 106 and a challenge generation module 108. The memory 104 stores a credential ID/public key lookup table 109 and relying party information 110.

The client device 200 may be in the form of a desktop or laptop computer, a tablet, a smart phone, or any other suitable computing device. In that sense, it may include (as shown in FIG. 3) components such as a processor 202 and a memory 204. For the purposes of this disclosure, the precise nature of the client device 200 is not important, as long as it includes sufficient components to act as an intermediary between the relying party 100 and authenticator 300.

The authenticator 300 has located thereon a processor 302 and a memory 304. The processor includes a key generation module 306, an authorization module 308, an attestation object generation module 310, and an assertion signature generation module 312. The memory 304 stores authenticator data 314, authorization data 316, and a secret key 316. A specific example of a method which may be performed by the system 1001 will now be described with reference to FIGS. 3 to 7.

Figure 4:
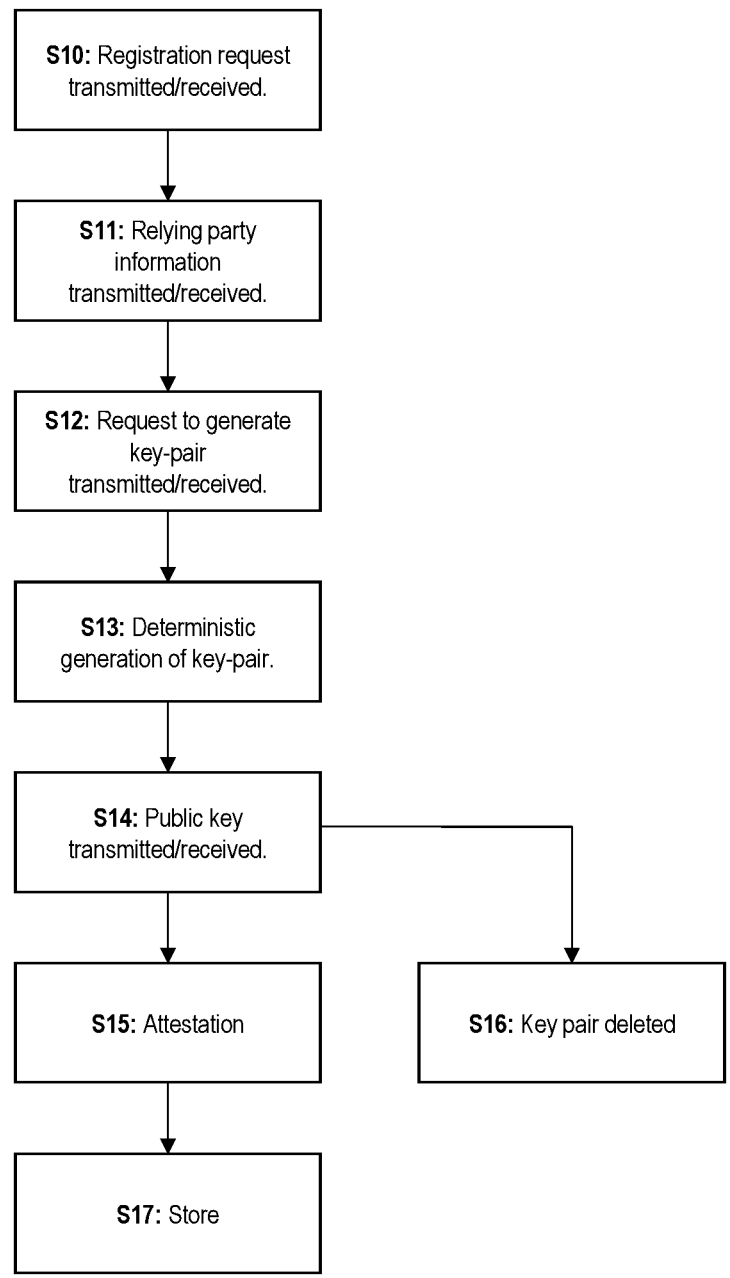
FIG. 4 is a flowchart illustrating a registration process falling within the scope of the present disclosure.
Figure 7:
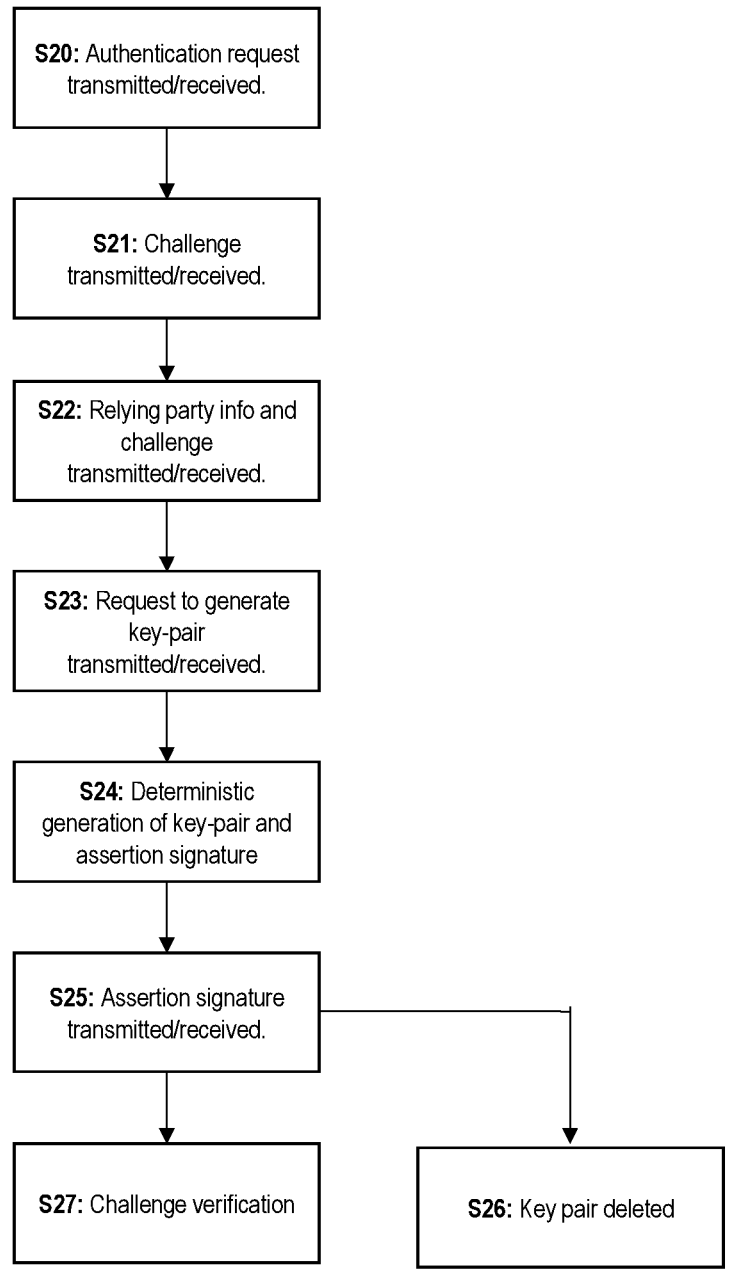
FIG. 7 is a flowchart illustrating an authentication process falling within the scope of the present disclosure.

FIG. 4 shows a flowchart of a registration process which may take place using the system of FIG. 3. FIG. 7 shows an equivalent flowchart for an authentication process, and will be described separately. During registration, a user who registers a new account on a relying party 100, with their authenticator 300, will most likely use web browser 202 on the client device 200. The web browser 202 may implement a WebAuthn specification, discussed in the "Background" section of this application. The web browser 202's WebAuthn implementation may make calls to the authenticator 200 using the CTAP2 protocol, which uses a binary format CBOR to encode data. In a first step S10, the client device 200 may transmit a registration request to the relying party 100. This request may be prompted by a user pressing "Register" on the relying party 100's website using the web browser 202. Then, in response to this request from the client device 200, in step S11 the relying party 100 may then transmit relying party information 110 to the client device 200. Specifically, the relying party information 110 may include a relying party ID. Optionally, the relying party 100 may also transmit a challenge (randomly-generated server-side, to prevent replay attacks) and a list of public key algorithms that the relying party 100 supports.

In step S12, the client device 200 transmits a key-pair generation request to the authenticator 300. In addition to the key-pair generation request, the client device 200 may also transmit key-generation data to the authenticator 300, which may include the relying party information (specifically, the relying party ID), a user ID, the URL associated with the relying party 100. The key generation data may include a client data hash, which is a hash of client-related information. At this point, either the method can proceed straight to step S13, in which the key-pair is deterministically generated. However, in some cases, an authorization procedure may take place first, as illustrated in FIG. 5.

Figure 5:
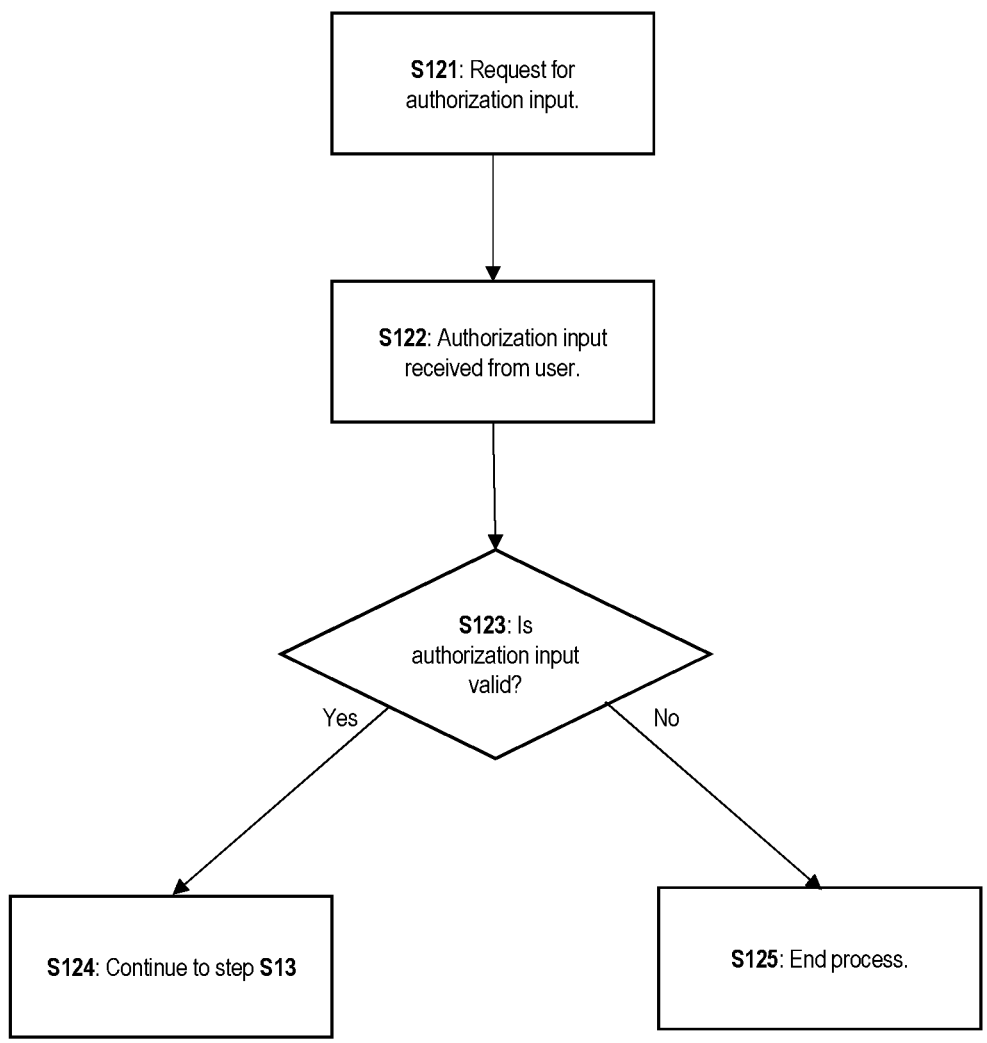
FIG. 5 is a flowchart illustrating an example of an optional authorization process which may be performed in the method of the present disclosure.

The purpose of the authorization process shown in FIG. 5 is to ensure that the user who is carrying out the registration process is the owner of the authenticator 300. In order to do this, the authorization process provides an extra layer of authorization in which a user inputs some kind of unique authorization input into either the client device 200 or authenticator 300 in order to prove that they are authorized, as it were, to use the authenticator 300. With this in mind, in step S121 (which may take place in response to step S12 of FIG. 4, in which the authenticator 300 receives a request to generate a key-pair), a request for an authorization input is transmitted. The request may be transmitted from the authenticator 300 to the client device 200, whereupon it is rendered and displayed to the user. Alternatively, the authenticator 300 may directly display or otherwise indicate the request to the user itself. In some cases, the client device 200 may generate and display the request itself, without any input from the authenticator 300.

In response to the request for an authorization input in step S121, an authorization input may be received from a user in step S122. The authorization input may include, or be in the form of a password, a PIN, a biometric input (e.g. face recognition, a fingerprint, an iris scan, a retinal scan, or a voice recognition), or an authorization gesture (e.g. tracing a pattern). Other suitable authorization inputs are also envisaged. Once the authorization input has been received in step S122, it is validated in step S123. In order to perform this validation step, the authorization input, or data derived from the authorization input received from the user may be compared with stored data corresponding to an expected authorization input associated with the user in question. This stored data may be the authorization data 316 stored on the memory 304 of the authenticator 300, and the process may be performed by the authorization module 308 of the processor 302. The next step depends on whether the authorization input is validated or not in step S123:

If the authorization input is validated, then the method continues with step S13 of FIG. 4.

If not, it is determined that the user is not authorized to use the authenticator 300 to register an account with the relying party 100, and the registration process ends. In other words, none of the steps from S13 onwards takes place. In some cases, if the authorization input is not accepted, then the user may be prompted to try again. The process may only end after, for example, a predetermined number of invalid requests.

The method of FIG. 4 continues at step S13, in which the key-pair is deterministically generated. Specifically, in step S13, the key generation module 306 of processor 302 of the authenticator 300 deterministically generates a key-pair based on at least the secret key 316 which is stored on memory 304 of the authenticator 300, and the key generation data which is received from the client device 200 in step S11. There are numerous methods by which the key pair may be generated by the key generation module 306.

In preferred cases, the present disclosure is applicable to the generation of a public key P and a private key k which can be used in elliptic curve cryptography. In these cases, for a given elliptic curve cryptography function (for which there is an associated base point and elliptic curve equation) and initial point, the private key k is the number of iterations of the elliptic curve cryptography function which are performed starting with the initial point. After k iterations of the elliptic curve cryptography function, a point P is output. In these cases, the private key k is an integer, and the public key P is a point on a curve. In order to generate a private key k, according to the present disclosure, the secret key 316 and key-generation data are used to generate a (very) large integer k (typically 253 or 256 bits), which represents the private key k, and is then used to generate a public key P.

Figure 6C:
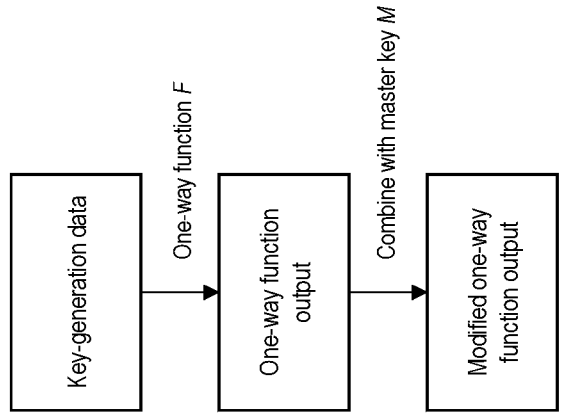
FIGS. 6A to 6C illustrate various ways in which an integer can be derived from the key-generation data.
Figure 6B:
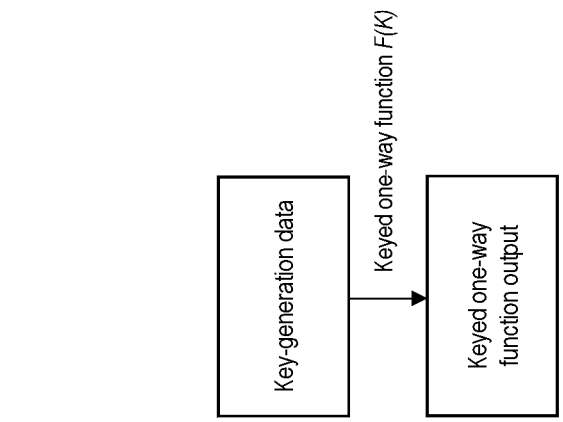
Figure 6A:
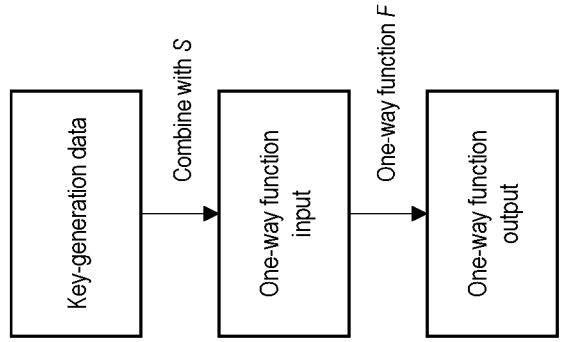

Various methods are used to generate the large integer k. FIGS. 6A to 6C illustrate three different ways in which a secret key can be incorporated into the generated key-pair. Specifically, the secret key may take the form of a secret salt S, a function key K, or a master key M. As before, it should be stressed that the key generation process may utilize any, some, or all of these types of secret key, i.e. the processes of FIGS. 6A to 6C may well be combined. In all cases, the integer is generated by at least the application of a one-way function to a one-way function input, to generate a one-way function output. Examples of appropriate one-way functions are set out elsewhere in this application.

In FIG. 6A, in a first step, a secret salt S is combined with the key-generation data (or a representation thereof), to generate the one-way function input. The one way function is then applied to the one-way function input to generate the one-way function output. In the event that the one-way function output is not in an appropriate form for generation of the key-pair, the method may include some additional steps, discussed shortly. Here, the secret salt S may be combined with the key-generation data (or a representation thereof) in a number of ways. For example, the secret salt may be added to the key-generation data, concatenated with the key-generation data, or otherwise combined.

In FIG. 6B, the key-generation data (or a representation thereof) is the one-way function input. Then, a keyed one-way function is applied to the one-way function input, the nature of the keyed one-way function dependent on a function key K which is intrinsic to the function itself, to generate the one-way function output.

In FIG. 6C, the key-generation data (or a representation thereof) is the one-way function input. Then, a one-way function is applied to it, to generate the one-way function output. At that point, the one-way function output is combined with a master key M to generate a modified one-way function output, which may be the integer. As discussed, the combination of the one-way function output and the master key M may take place in a number of different ways.

In some cases, the one-way function output may not be in the correct format, or the correct form, for use as e.g. an ECC key. In these cases, the method may further include using a key stretching algorithm or another appropriate algorithm to convert the one-way function into a key in a suitable format.

At this point, the key-pair comprising the private key k and the public key P has now been generated, which may be denoted more concisely as (P, k). Returning now to FIG. 4, the next step to take place is step S14, in which the public key P only is transmitted from the authenticator 300 to the client device 200. Specifically, rather than transmitting only the public key P, the authenticator 300, or more precisely, an attestation object generation module 310 thereof, may generate an attestation object and transmit it to the client device 200. The authenticator 300 generates, for each public key P, an attestation statement which is verifiable by the relying party 100. The attestation object preferably includes such an attestation statement, which may include the public key P, (or statements about it), authenticator data 314 (i.e. information relating to the authenticator 300 which created the public key P), and/or a credential ID. Additional detail about attestation can be found in section 6.4 of the WebAuthn specification[7], and the definitions of "Attestation" and "Attestation Certificate" in section 4 of the WebAuthn specification[8], all of which are incorporated herein by reference.

[7] https://www.w3.org/TR/webauthn/#sctn-attestation
[8] https://www.w3.org/TR/webauthn/#terminology After the public key P has been transmitted to the client device 200 (in the form of an attestation object) in step S14, the key-pair is deleted from the authenticator 300 in step S16. This is an important feature of the present disclosure, because by deleting the key-pairs after each time they have been generated and used, the persistent memory requirements are much reduced.

In parallel with the deletion, an attestation process takes place in step S15. First, the client device 200 transmits the attestation object to the relying party 100. In the attestation process, the relying party 100 may verify that the authenticator 300 is actually the model that it asserts itself to be (e.g. by validating the authenticator data 314). The process may also involve a check that user verification was performed by the authenticator 300 (i.e. the validation of an authorization input as described with reference to FIG. 5). If attestation is successful in step S15, the method moves on to step S17, in which the public key P is stored, in conjunction with the credential ID, in the credential ID/public key lookup table 109 in the memory 104 of the relying party server 101. As the name suggests, the credential ID/public key lookup table 109 stores all of the public keys P associated with the relying party 100 in association with some credential ID, so that they can be retrieved during an authentication process.

We now go on to describe the authentication process, illustrated in FIG. 7. This process is similar to the registration process shown in FIG. 4, and may be performed using the system 1001 shown in FIG. 3. For conciseness, description of processes which have already been described in detail will not be repeated here. In a first step S20, the client device 200 transmits an authentication request to the relying party 100. This may be prompted by a user typing in their username and password to a website, and clicking "Login". In response to receiving this request, in step S21, the challenge generation module 108 of the processor 102 of the relying party server 101 generates a challenge, and transmits it to the client device 200. Then, in step S22, the challenge and at least the relying party information are transmitted to the authenticator 300. In addition to these two components, the client device 200 may also transmit client data (or a hash thereof) to the authenticator 300. Optionally, after step S22, an authorization procedure such as the one described with reference to FIG. 5 may take place.

In step S23, deterministic generation of the key-pair takes place. This takes place in the same way as step S13 of FIG. 4. The methods of FIG. 6A to 6C apply equally well here, and description thereof will not be repeated. In addition to generation of the key pair (P, k), an assertion signature is also generated in step S24. The assertion signature may be generated using an authentication algorithm[9] such as a digital signature algorithm, or other signature scheme. In some cases the assertion signature may be further encrypted for transport using e.g. another public key known by the authenticator. Then, in step S25, the assertion signature is transmitted to the client device 200, and from there, to the relying party 100. In addition to this, the client device 200 may also transmit the credential ID, the client data, and the authenticator data 314 to the relying party 100. Once the authenticator 300 has sent the information to the client device in step S25, the key-pair is deleted from the authenticator 300 in step S26. The final step in the authentication process shown in FIG. 7 is for the validation module 106 of the relying party 100 to verify the assertion signature. If all checks are successful, then the user is successfully authenticated.

[9] https://www.w3.org/TR/webauthn/#op-get-assertion

Figure 8:
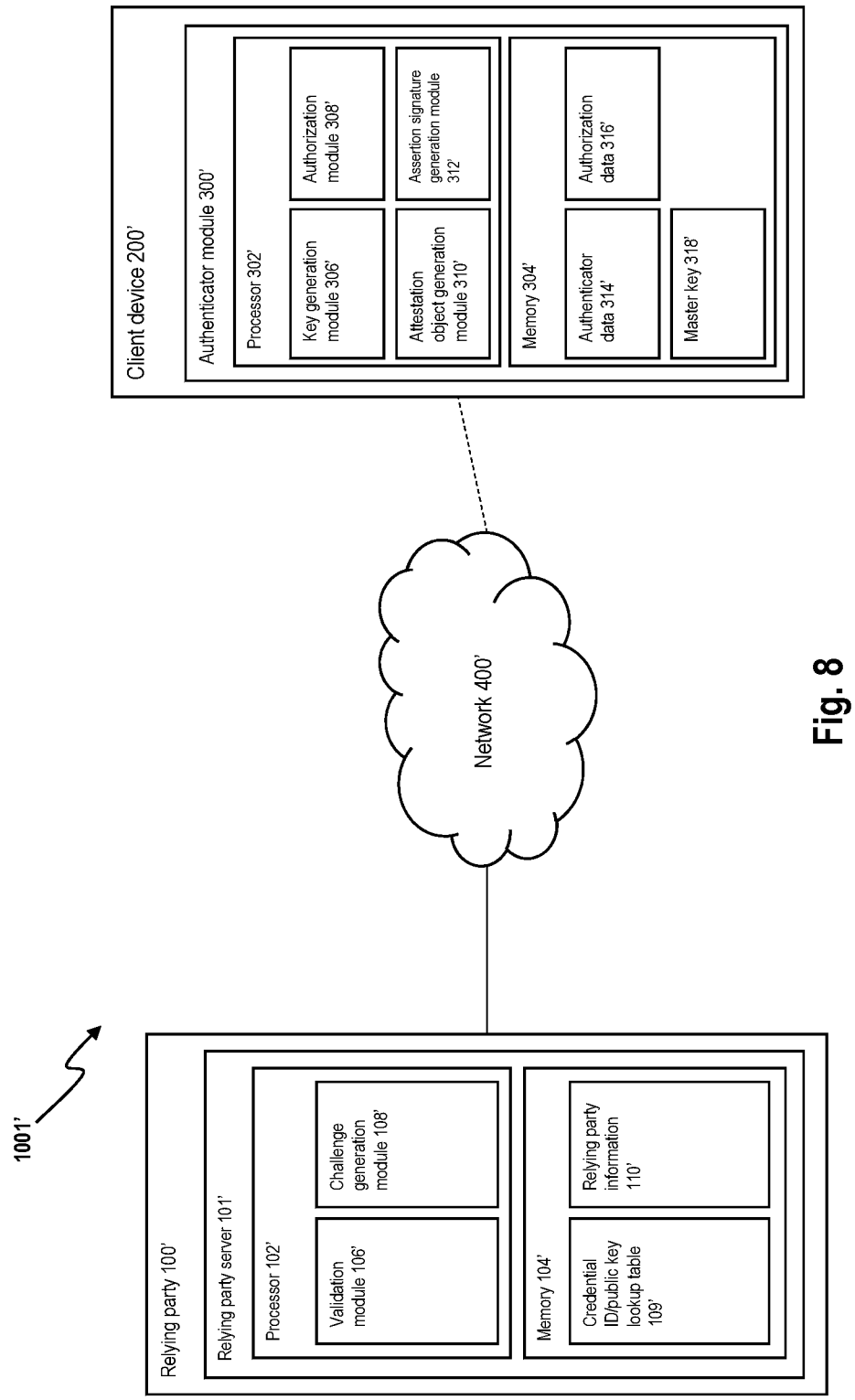
FIG. 8 shows an example of another system which may be used to perform the method of the first aspect of the disclosure.

FIG. 8 shows an alternative system 1001', which is identical to the system 1001 of FIG. 3, except that in the case of system 1001', the authenticator is in the form of an authentication module 300' which is located on the client device 200'. As discussed previously, the authentication module 300', and all its constituent functional modules (i.e. the key generation module 306', the authorization module 308', the attestation object generation module 310', and the assertion signature generation module 312') may be implemented either as bespoke hardware modules, or they may be implemented in software. The description relating to the methods of FIGS. 4 to 7 with reference to FIG. 3 applies equally well to FIG. 8.

The invention claimed is:

1. A method of registering or authenticating a user with a relying party, the method comprising:
receiving, at an authenticator, a request to generate a key pair, the request including key-generation data, the key-generation data including relying party information associated with the relying party and user information associated with the user;
deterministically generating, at the authenticator, based on the relying party information, the user information, and a secret key stored in a memory of the authenticator, a key pair comprising a public key and a private key;
one or more of transmitting the public key or performing further processing using the private key to register or authenticate the user with the relying party; and
deleting the key pair from the memory of the authenticator.

2. The method of claim 1, wherein the key pair is an elliptic curve key pair.

3. The method of claim 2, wherein:
either:
the memory of the authenticator stores an elliptic curve equation, a base point, and a predetermined function, or
the key-generation data includes an elliptic curve equation, a base point, and a predetermined function; and
wherein generating the key pair comprises deterministically generating an integer based on the secret key and the key-generation data; and deriving a point based on the integer and the key-generation data, wherein:
the point is the public key, and
the integer is the private key.

4. The method of claim 3, wherein:
the method further includes applying a one-way function to a one-way-function input, the one-way-function input being based on the key-generation data, to generate a one-way-function output; and
either:
the one-way-function output is the integer; or
the method further includes generating the integer from the one-way function output.

5. The method of claim 4, further comprising combining a salt with the one-way-function input before applying the one-way function.

6. The method of claim 4, wherein the one-way function is a keyed one-way function, an output of which is dependent on a function key.

7. The method of claim 6, wherein the keyed one-way function is a hash-based method authentication code (HMAC) function, and the function key is an HMAC key.

8. The method of claim 4, further comprising combining the one-way-function output with a master key to generate the integer.

9. The method of claim 1, wherein the key-generation data includes a tuple of data comprising at least a relying party ID and a user ID.

10. The method of claim 1, further comprising:
receiving an authorization input from a user; and
validating the authorization input by comparing data derived from the authorization input with stored data corresponding to an expected authorization input associated with the user in question;
wherein the key pair is deterministically generated responsive to validating the authorization input.

11. The method of claim 1, further comprising:
registering a user with the relying party; and
transmitting an attestation object to a client device of the user, the attestation object including the public key, and one or more of: a credential ID associated with the public key, and an attestation signature.

12. The method of claim 1, wherein:
the method is a method of authenticating a user with the relying party; and
the method further comprises:
receiving authentication challenge data from a client device of the user;
generating an assertion signature using an authentication algorithm such as a digital signature algorithm; and
transmitting the generated assertion signature to the client device.

13. An authenticator for registering or authenticating a user with a relying party, the authenticator configured to:
receive a request to generate a key pair, the request including key-generation data, the key-generation data including relying party information associated with the relying party and user information associated with the user;
deterministically generate, based on the relying party information, the user information, and a secret key stored in a memory of the authenticator, a key pair comprising a public key and a private key;
one or more of transmit the public key or perform further processing using the private key to register or authenticate the user with the relying party; and
delete the key pair from the memory of the authenticator.

14. The authenticator of claim 13, wherein:
the key pair is an elliptic curve key pair;
either:
the memory of the authenticator stores an elliptic curve equation, a base point, and a predetermined function, or:
the key-generation data includes an elliptic curve equation, a base point, and a predetermined function; and
to generate the key pair, the authenticator is configured to deterministically generate an integer based on the secret key and the key-generation data; and deriving a point based on the integer and the key-generation data, wherein:
the point is the public key, and
the integer is the private key.

15. The authenticator of claim 14, wherein:
the authenticator is further configured to apply a one-way function to a one-way function input, the one-way function being based on the key-generation data, to generate a one-way function output; and
either:

the one-way function output is the integer; or the authenticator is further configured to generate an integer from the one-way function output.

16. The authenticator of claim 15, wherein the authenticator is further configured to combine a salt with the one-way function input before applying the one-way function.

17. The authenticator of claim 15, wherein the one-way function is a keyed one-way function, and wherein an output of the keyed one-way function is dependent on a function key.

18. The authenticator of claim 17, wherein the keyed one-way function is a hash-based method authentication code (HMAC) function, and the function key is an HMAC key.

19. The authenticator of claim 13, wherein the authenticator is a standalone device including an interface for connecting with a client device.

20. The authenticator of claim 13, wherein the authenticator is a module on an electronic device.

* * * * *